United States Patent Office 3,442,450
Patented May 6, 1969

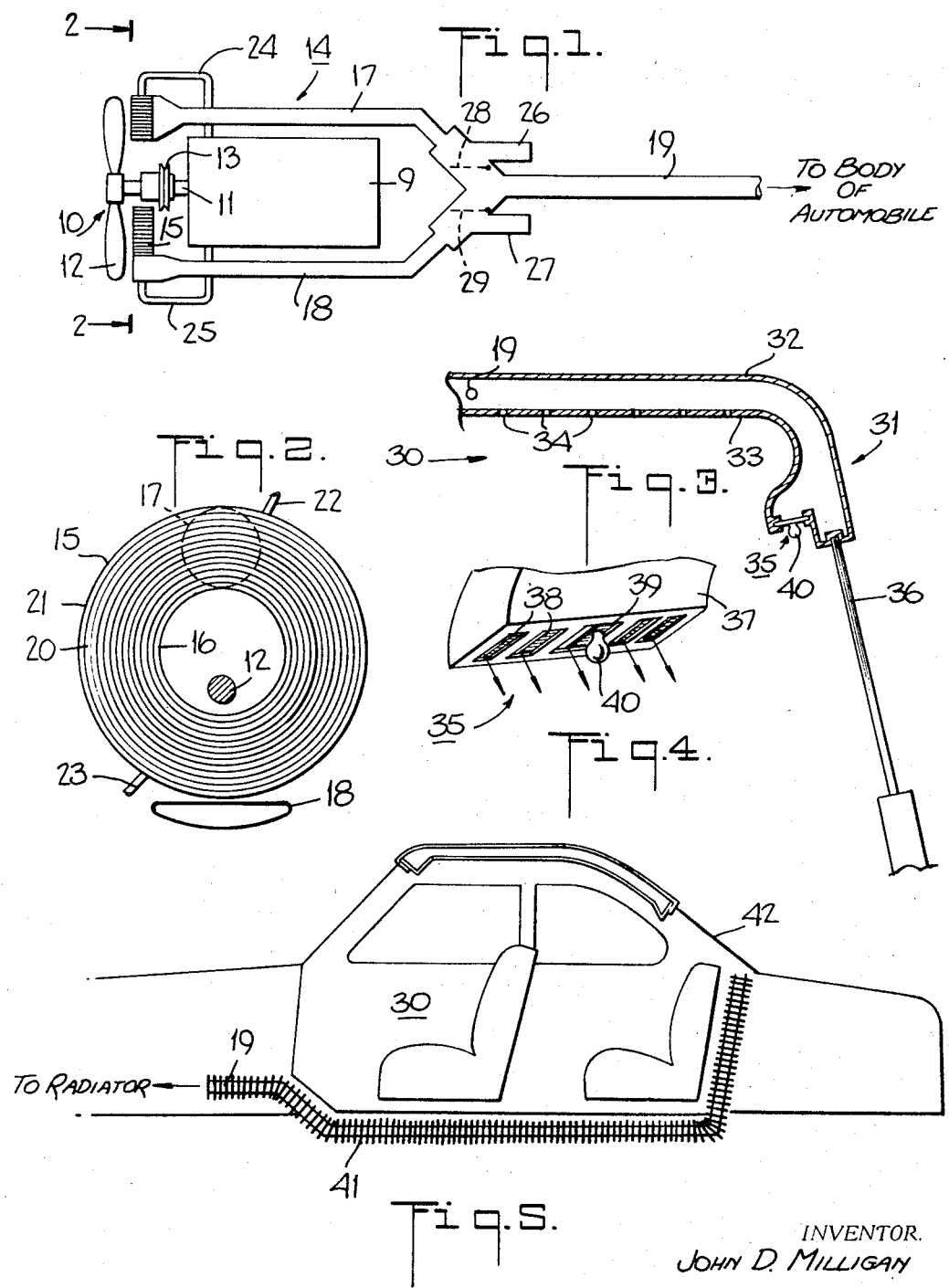

3,442,450
MOTOR VEHICLE HEATER ASSEMBLY
John D. Milligan, 650 Prospect Ave.,
Little Silver, N.J. 07739
Filed June 15, 1967, Ser. No. 646,300
Int. Cl. B60h 1/06
U.S. Cl. 237—12.3                                        9 Claims

ABSTRACT OF THE DISCLOSURE

The heater assembly is mounted in back of the fan blade and radiator so that the fan blade pushes air through the radiator into manifolds which conduct the flows of air to the passenger compartment. The air is heated upon passing through the radiator and is regulated as to flow by a valve within the manifold and as to temperature by being mixed with cool air passed into the manifold by the fan blade from below the radiator.

---

This invention relates to a motor vehicle heater assembly. More particularly, this invention relates to a motor vehicle assembly which utilizes the radiator of a vehicle to heat the interior of the vehicle.

Heretofore, automotive vehicles, especially automobiles, have frequently utilized heat exchange units which have been separately mounted within the engine compartment of the vehicles to heat a flow of air prior to the introduction of the air into the passenger compartment of the vehicles. In some instances, the heat exchange units have been connected in the coolant circuit for cooling the engine of the vehicle so that as the heated coolant from the engine passed through the heat exchange units, the air flowing through the heat exchange units became heated. For example, several automotive heaters take a stream of water by means of a rubber hose connected to the engine block to a heater located under the dashboard in the passenger compartment and thence through another hose back to the circulating pump. In passing through the heater, the stream of water which is in a heated state transfers heat to a stream of air conducted through the heater through an independent conduit so as to heat the air. After being heated, the air is directed into the passenger compartment so as to be directed to the base of the windshield and to the bottom of the front of the passenger compartment. In other instances, the heat exchange units have been independent of the engine coolant circuit. In such cases a direct flow of air from the exterior of the automobile has been directed through a suitable cowl over electrical heating coils within suitable manifolds inside the automobile and then directed in a heated state into the passenger compartment of the automobile.

However, these heretofore heat exchange units have required electrical motors and fans to direct a flow of air into the passenger compartment of an automobile. Because of this, the electrical system of the automobile has had greater loads imposed thereon during operation of the heat exchange units. Further, those heat exchange units which have utilized the engine block coolant to heat a flow of air have required water control valves, hoses, connectors, etc., all of which have been subject to leakage of water while being costly. Also, where a fan has been installed within a heated air conduit to pump air into an automobile, the fan has frequently acted as a flow restriction at high speeds. In addition, because the heated air has been directed into the passenger compartment of the automobile at the front, an efficient heating of the entire passenger compartment has not been realized by these heat exchange units.

Accordingly, it is an object of the invention to direct a flow of air directly through the radiator of a motor vehicle and into the passenger compartment of the vehicle to heat the passenger compartment.

It is another object of the invention to provide a heater assembly for efficiently heating the passenger compartment of a motor vehicle.

It is another object of the invention to provide a motor vehicle with a large quantity of heat at a relatively low cost.

It is another object of the invention to distribute a flow of heated air about the passenger compartment of a motor vehicle in a relatively efficient manner.

It is another object of the invention to provide a motor vehicle with a heater assembly which is capable of supplying heated air to the passenger compartment of the vehicle.

It is another object of the invention to provide a heater assembly which is relatively free of mechanical failure.

Briefly, the invention provides a motor vehicle with a heater assembly which utilizes the fan commonly mounted in front of the engine block of the vehicle. The heater assembly includes a radiator which is operably connected to the engine block to circulate a flow of the heated engine coolant therethrough for cooling purposes and which includes an aperture through which the fan shaft of the fan passes so that the radiator is positioned between the fan blade and engine block. Thus, upon rotation of the fan shaft and fan blade, a stream of air is forced by the fan blade toward the radiator in the direction of the engine block. The radiator is formed with passage means to conduct the forced stream of air through the radiator from one side to the other so as to cool the heated coolant coursing through the radiator and to heat the air passing through the radiator in a heat transfer relation. In addition, the heater assembly includes a manifold means which is connected at one end to the hottest portion of the radiator in communication with a section of the passage means through the radiator to receive a portion of the heated stream of air passing from the radiator. The manifold means is connected at its opposite end to the passenger compartment of the motor vehicle so as to deliver the heated stream of air into the compartment for heating and defrosting purposes.

In order to control the amount of heated air passing through the manifold means to the passenger compartment, a control valve and a by-pass conduit are interconnected into the manifold means. The control valve is operably disposed between the manifold means and the by-pass conduit so as to be selectably moved between one or the other to distribute the flow of heated air between the two and thereby vary the flow of heated air in the manifold means.

In order to regulate the temperature of the heated air passing into the passenger compartment from the radiator, the manifold means is provided with an intake manifold which has a mouth positioned in spaced relation to the radiator in the path of the flow of air from the fan blade to receive a flow of cool air. The intake manifold conducts the cool air into a common manifold of the manifold means where the cool air is mixed with the heated air passing through the manifold means. The mixing of the cool and heated air causes the air mixture to take on an intermediate temperature before passage into the passenger compartment.

The amount of cool air passing through the intake manifold is regulated by a control valve and by-pass conduit arrangement as in the manifold means for regulating the amount of heated air passing through the manifold means to the passenger compartment.

The air finally passing into the passenger compartment is thus regulated as to temperature as well as to volume.

In order to conduct the heated or cool air into the passenger compartment, the manifold means is connected in one embodiment conduit means positioned about the roof of the compartment so as to conduct the air into the compartment generally uniformly from the roof. In another embodiment, the manifold means is connected to other conduit means to direct a flow of air into the passenger compartment against the windshield as well as the rear and side windows of the vehicle for defrosting or defogging purposes.

These and other objects and advantages of the invention will become more apparent from the following detailed description and appended claims taken in conjunction with the accompanying drawings in which:

FIG. 1 illustrates a partial schematic view of a heater assembly of the invention;

FIG. 2 illustrates a view taken on line 2—2 of FIG. 1;

FIG. 3 illustrates a cross-sectional view of a roof of a motor vehicle adjacent a side window incorporating a conduit means for directing air through the roof into a passenger compartment and against the side window;

FIG. 4 is a perspective view of an adjustable shutter for controlling the flow of air toward the side window of FIG. 3; and FIG. 5 illustrates a schematic view of a motor vehicle body incorporating conduit means of the invention for directing heated or cooled air into the passenger compartment of the body.

Referring to FIGS. 1 and 2, the engine block 9 of a motor vehicle has a fan 10 mounted thereon in a conventional manner. The fan 10 includes a fan shaft 11 rotatably mounted in the engine block and a fan blade 12 fixedly mounted on the fan shaft 11. The fan shaft 11 mounts a pulley wheel 13 which is driven by a pulley wheel on the crankshaft (not shown) through a known fan belt (not shown). The heater assembly 14 includes a radiator 15 having a centrally disposed aperture 16, a heated air intake manifold 17 connected to the radiator 15, a cool air intake manifold 18 below the radiator 15 and a common manifold 19 connected between the intake manifolds 17, 18 and the body of the motor vehicle (not shown).

The heater assembly 14 is disposed relative to the engine block 9 and fan 10 so that the fan shaft 11 passes through the aperture 16 of the radiator 15 to position the fan blade 12 on the opposite side of the radiator 15 from the engine block 9. In addition, the radiator 15 and the cool air intake manifold 18 are sized so as to be in the path of a stream of air generated by the fan blade 12 upon rotation. For example, where the radiator 15 is of a generally circular configuration, the fan shaft 11 is eccentric to the axis of the radiator 15 and the intake manifold 18 is positioned below the radiator so that the mouth of the manifold is within the projected plane of the fan blade 12.

The radiator 15 is formed, for example, as is heat exchanger in my copending abandoned patent application, entitled Heat Exchanger, Ser. No. 569,405, filed Aug. 1, 1966, and a continuation in part application filed Aug. 8, 1967, Ser. No. 677,811 which matured into Patent 3,412,787 dated Nov. 26, 1968, by a closed tube component 20 and a corrugated plate component 21. These components 20, 21 are wound in a contiguous spiral relation so that the tube component is bounded on opposite sides by sections of the corrugated component to form convolutions or rings of the components, for example, as described in the above copending patent application. In addition, the components 20, 21 are wound to define the aperture 16.

In order to direct a flow of water from the engine block through the radiator 15, the radiator is provided with a pair of manifolds 22, 23 which communicate at one end with the tube component 20 at generally opposite radial points. These manifolds 22, 23 are connected at their opposite ends in a conventional manner to an outlet conduit 24 and an inlet conduit 25 of the engine block 9.

Thus, the coolant water flows from the engine block 9 in a heated state through the outlet conduit 24 into the radiator 15. As the fan blade 12 is caused to rotate, a stream of air is forced through the corrugated component 21 of the radiator 15 to cool the water flowing through the tube component 20. The cooled water then leaves the radiator through manifold 23 and flows through conduit 25 back into the engine block 9 by means of a conventional water pump (not shown) to cool the engine block.

As the air passes through the radiator 15 to cool the water flowing through the tube component, the air becomes heated. The heated air intake manifold 17 is connected to the radiator 15 approximately at the point where the entering heated water is hottest, for example, at the top of the radiator 15, so that the mouth of the manifold is in direct communication with an open side of the corrugated component of the radiator. For example, the mouth of the intake manifold 17 is made with a generally cylindrical cross-section and is welded, or otherwise connected, to the side of the radiator 15, opposite the fan blade 12 across a plurality of convolutions or rings of the radiator. The sections of the corrugated component 21 within the projected path of the mouth of the manifold 17 thus act as conduits substantially parallel to the axis of the aperture 16 for the passage of air through the radiator into the manifold. The air passing through the radiator in this area is thus received in the intake manifold 17 while in a heated state due to a transfer of heat from the heated water in the radiator 15. The manifold 17 then directs the heated air into manifold 19 for delivery into the passenger compartment in the body of the vehicle.

At the same time that a heated flow of air is directed into intake manifold 17, a cooled flow of air is directed by the fan blade 12 into the elongated mouth of manifold 18. The cool stream of air is then conducted through intake manifold 18 into manifold 19. Upon entering manifold 19, the stream of heated air and the stream of cool air mix together to achieve an air temperature between the extremes of air temperature of the two streams.

In order to regulate the temperature of the air stream in manifold 19, each intake manifold 17, 18 is provided with a by-pass conduit 26, 27 and a control valve 28, 29. The control valves 28, 29 are each pivotally mounted in the manifolds 17, 18 and controlled independently of each other, for example, by flexible wires (not shown) extending into the dashboard (not shown) of the motor vehicle. Each control valve is sized to completely obsrtuct the intake manifold in which it is mounted when placed in one extreme position as well as to obstruct the associated by-pass conduit when placed in the other extreme position. Further, when the control valves are in intermediate positions between the two extreme positions, each effectively reduces the flow of air through the manifolds 17, 18 into the common manifold 19 by by-passing a portion of each air flow through the by-pass conduits. Upon regulation of the amount of heated air and cool air admitted into the common manifold 19, the temperature of the air in the manifold is regulated to the desired temperature.

Referring to FIG. 3, the passenger compartment 30 of a motor vehicle 31 is heated by communicating the common manifold 19 (FIG. 1) with the space between the roof 32 of the motor vehicle and the inside lining 33 which is exposed to the compartment 30. The apertures 34 are sized and arranged in a pattern to emit the heated air received from conduit 19 in the space between the roof and lining in a substantially uniform manner into the passenger compartment 30.

Alternatively, the passenger compartment can be air cooled by closing the control valve 28 in the heated air intake manifold 17 so as to prevent heated air from entering manifold 19 while opening control valve 29 to permit cool air to flow from intake manifold 18 into the manifold 19 and thence through apertures 34 into the compartment 30.

Referring to FIGS. 3 and 5, the lining 33 can be additionally provided with a plurality of adjustable shutters at spaced points corresponding to the side or rear windows of the vehicle 31 for the purpose of allowing a flow of heated air from the radiator 15 (FIG. 1) to defrost or defog the window. Each adjustable shutter 35 is mounted at a lower peripheral edge of the lining adjacent a window 36 so as to direct an air flow toward the window 36. The shutter 35 includes a housing 37 integral with the lining 33, a series of perforated slots 38 in the lower surface of housing 37, slide 39 within housing 37 of a size to overlie the slots 38 and an adjusting knob 40 secured to slide 39 to move the slide 39 relative to slots 38 so as to allow air to pass through the slots 38 from within housing 37. Upon manual manipulation of the knob 40 to regulate the opening between the slide 39 and slots 38, a flow of heated or cool air is directed toward the window 36. Additionally, the adjustable shutters 35 can be used to regulate the pattern of air flow into the passenger compartment 30 to provide for passenger comfort.

Alternatively, independent conduits (not shown) can be provided between the common manifold 19 and the adjustable shutters 35 and between the manifold 19 and the space between the vehicle roof 32 and interior lining 33.

Referring to FIG. 5, the common manifold 19 can be connected to the tubular members 41 of the motor vehicle frame so as to direct a flow of heated or cooled air to the rear of the passenger compartment 30 adjacent the rear window 42. Alternatively, separate conduits or other tubular frame members (not shown) can be used to direct a flow of air from conduit 19 to various sections of the passenger compartment 30.

While the invention has been described above in regard to a radiator made in a manner similar to the heat exchanger in the above mentioned patent application, the heater assembly of the invention can also utilize any other type of automobile radiator provided that the fan blade causes a flow of air to be pushed directly into and through the radiator, i.e. that the fan blade is on the side of the radiator opposite the engine block. In addition, the common manifold which is adapted to conduct a mixture of the heated and cooled streams of air can be connected to any suitable number of conduits to direct a flow of air into any portion of the passenger compartment of a motor vehicle in any desired direction.

Further, the air which is conducted into the by-pass conduits 26, 27 can also be further conducted through suitable ducts (not shown) to provide for additional cooling of the engine block 9. Thus, when the control valves 28, 29 are positioned to close off the intake manifold 19, all of the radiator heat exchange surface can be used to cool the engine. Where desired suitable flow control valves can be positioned in these ducts to regulate the flow of by-passed air to the engine block.

The invention provides a motor vehicle heater assembly which eliminates any need to be operatively connected into the electrical system of a motor vehicle in order to produce a flow of heated air into the passenger compartment of the vehicle. The invention also eliminates the need of any heat exchange units within the passenger compartment of a motor vehicle for generating a heated stream of air. Further, since the heater assembly of the invention relies on the radiator of a motor vehicle for a supply of heat there is no need for any water control valves or water conducting conduits which require water-tight connections as well as additional expense. Also, since the heater assembly is made of components which conduct flows of water or air under forces generated by existing equipment of the engine block and fan of the vehicle, the heater assembly is relatively free of any possibility of a mechanical failure in passing heated air into the passenger compartment.

Because the heater assembly can be used on existing equipment with little or no modification, the heater assembly not only can be installed in a relatively inexpensive economical manner but also can provide a more uniform distribution of heated or cooled air into the passenger compartment of a motor vehicle. Also, the components are of light weight and, where necessary, as in the front end of a vehicle, can be made of suitable light weight materials to further reduce weight.

It is noted that by mounting the fan in front of the radiator, air is pushed into the radiator at an efficient rate. Further, with the fan in front of the radiator, air can be pushed, heated and introduced into the passenger compartment while the motor vehicle remains at rest provided the motor is running or accelerated. Also, with a vehicle traveling at a high speed, the fan while pushing a greater flow of air through the radiator and into the heating assembly does not become a source of flow restriction to the air.

The invention thus provides a heater assembly which is efficient, relatively light-weight, easily managed and installed, and economical to use.

Having thus described the invention it is not intended that it be so limited as changes may be readily made therein without departing from the scope of the invention. Accordingly, it is intended that the foregoing Abstract of the Disclosure, and the subject matter described above and shown in the drawings be interpreted as illustrative and not in a limiting sense.

What is claimed is:

1. In combination with a motor vehicle having an engine block, a passenger compartment, a roof over said passenger compartment, and a lining spaced from said roof in the direction of said passenger compartment to form a space therebetween, said lining having a plurality of perforations therein; a heater assembly comprising a radiator operatively connected to said engine block for passing a flow of heated coolant therethrough, means mounted on one side of said radiator opposite said engine block for forcing a flow of cool air toward said radiator in the dierction of said engine block, passage means in said radiator for conducting a portion of the forced stream of air through said radiator to absorb heat from the heated coolant passing through said radiator, and manifold means connected at one end to said radiator in communication with said passage means to receive a heated stream of air therefrom and connected at an opposite end thereof to the space between said roof and lining to direct the received heated stream of air thereinto for passage through said perforations into said passenger compartment.

2. The combination as set forth in claim 1 wherein said means for forcing a flow of air toward said radiator includes a fan shaft rotatably mounted in said engine block and passing through said radiator, and a fan blade mounted on said fan shaft on the side opposite said engine block.

3. The combination as set forth in claim 1 which further comprises at least one adjustable shutter means mounted in said lining at the periphery thereof, said shutter means having at least one slot for communicating the space between said lining and said roof with said passenger compartment and an adjustable slide for exposing said slot to permit passage of air from said space to said passenger compartment.

4. The combination as set forth in claim 1 wherein said manifold means includes a first intake manifold connected to said opposite side of said radiator in communication with said passage means to receive a heated stream of air therefrom, a common manifold connected to an opposite end of said first intake manifold to receive the heated stream of air, a by-pass conduit connected to said first intake manifold upstream of said common manifold, and a control valve means operatively selectably disposed between said first intake manifold and said by-pass conduit for regulating the flow of heated air from said intake manifold to said common manifold.

5. The combination as set forth in claim 4 wherein said manifold means further includes a second intake manifold having a mouth at one end positioned in spaced relation from said radiator in the projected path of said means mounted on one side of said radiator to receive another portion of the forced stream of air, said second intake manifold being connected at the opposite end thereof to said common manifold for delivering said other portion of the forced stream of air into said common manifold to mix with the heated stream of air therein whereby the temperature of the air in said common manifold can be regulated.

6. The combination as set forth in claim 5 which further comprises a second by-pass conduit connected to said second intake manifold upstream of said common manifold, and a second control valve means operatively selectably disposed between said second intake manifold and said second by-pass conduit for regulating the flow of air from said second intake manifold to said common manifold.

7. The combination as set forth in claim 5 wherein said first intake manifold is connected to said radiator at the top thereof and said second intake manifold is positioned below said radiator.

8. The combination as set forth in claim 5 wherein said first intake manifold is connected to said radiator at the hottest part thereof.

9. The combination as set forth in claim 5 wherein said fan shaft is eccentric to said radiator whereby both said radiator and said mouth of said second manifold means are in the projected path of said fan blade.

References Cited
UNITED STATES PATENTS

| | | |
|---|---|---|
| 1,903,653 | 4/1933 | Brock. |
| 2,159,599 | 5/1939 | Morrison. |
| 2,316,421 | 4/1943 | Hans. |
| 2,430,759 | 11/1947 | Crise. |
| 2,473,281 | 6/1949 | Findley. |
| 2,687,684 | 8/1954 | Hunt _____ 98—2.4 |
| 2,717,045 | 9/1955 | Nallinger _____ 98—2.4 |
| 2,729,158 | 1/1956 | Wilfert. |

EDWARD J. MICHAEL, *Primary Examiner.*

U.S. Cl. X.R.

98—2